United States Patent
Seshadri et al.

(10) Patent No.: US 8,204,435 B2
(45) Date of Patent: *Jun. 19, 2012

(54) WIRELESS HEADSET SUPPORTING ENHANCED CALL FUNCTIONS

(75) Inventors: Nambirajan Seshadri, Irvine, CA (US); James D. Bennett, San Clemente, CA (US); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 558 days.

This patent is subject to a terminal disclaimer.

(21) Appl. No.: 11/120,752

(22) Filed: May 3, 2005

(65) Prior Publication Data

US 2005/0202857 A1  Sep. 15, 2005

Related U.S. Application Data

(60) Provisional application No. 60/645,872, filed on Jan. 21, 2005.

(51) Int. Cl.
*H04B 5/00* (2006.01)
*H04B 1/38* (2006.01)
*H04M 1/00* (2006.01)

(52) U.S. Cl. .................................. 455/41.2; 455/569.1

(58) Field of Classification Search .............. 455/550.1, 455/556.1, 556.2, 569.1, 575.2, 41.2, 41.3; 381/74

See application file for complete search history.

(56) References Cited

U.S. PATENT DOCUMENTS

| | | | |
|---|---|---|---|
| 5,113,428 A | 5/1992 | Fitzgerald | |
| 5,479,522 A | 12/1995 | Lindemann | |
| 5,568,516 A | 10/1996 | Strohallen | |
| 5,590,417 A | 12/1996 | Rydbeck | |
| 5,790,952 A | 8/1998 | Seazholtz | |
| 5,794,163 A | 8/1998 | Paterson | |
| 5,913,163 A | 6/1999 | Johansson | |
| 5,966,667 A | 10/1999 | Halloran | |
| 6,078,825 A | 6/2000 | Hahn | |
| 6,112,103 A | 8/2000 | Puthuff | |
| 6,223,029 B1 | 4/2001 | Stenman | |
| 6,269,259 B1 | 7/2001 | Lai | |
| 6,339,706 B1 * | 1/2002 | Tillgren et al. | 455/419 |
| 6,374,126 B1 | 4/2002 | MacDonald, Jr. | |
| 6,473,630 B1 | 10/2002 | Baranowski | |
| 6,714,233 B2 | 3/2004 | Chihara | |

(Continued)

FOREIGN PATENT DOCUMENTS

WO  0217564 A2  2/2002

*Primary Examiner* — Nguyen Vo

(74) *Attorney, Agent, or Firm* — Garlick & Markison; Kevin L. Smith

(57) ABSTRACT

A modular wireless headset includes earpiece(s) and microphone(s), where the earpiece and microphone may be physically separate devices. The earpiece renders inbound radio frequencies received from a host device audible. The earpiece may include a receiver module, data recovery module, and speaker module. The receiver module may convert inbound RF signals into low intermediate frequency (IF) signals. The data recovery module recovers audio signals from the low IF signals. The speaker module renders the audio signals audible. The microphone converts received audio signals into outbound RF signals, where the outbound RF signals are transmitted to the host device. The microphone includes an audio input module and a transmitter module. The audio input module is operably coupled to convert received analog audio signals into digital audio signals. The transmitter module is operably coupled to convert the digital audio signals into the outbound RF signals.

28 Claims, 12 Drawing Sheets

U.S. PATENT DOCUMENTS

| | | |
|---|---|---|
| 6,745,014 B1 | 6/2004 | Seibert |
| 6,757,517 B2 | 6/2004 | Chang |
| 6,760,458 B1 | 7/2004 | Bogeskov-Jensen |
| 6,834,192 B1 | 12/2004 | Watanabe |
| 6,862,445 B1 | 3/2005 | Cohen |
| 6,885,848 B2 | 4/2005 | Lee |
| 6,980,204 B1 | 12/2005 | Hawkins |
| 7,010,288 B2 | 3/2006 | Brown |
| 7,076,277 B2 | 7/2006 | Kim |
| 7,095,981 B1 | 8/2006 | Voroba |
| 7,107,010 B2 | 9/2006 | Heinonen |
| 7,120,476 B2 | 10/2006 | Yoo |
| 7,127,250 B2 | 10/2006 | Gallagher |
| 7,136,670 B1 | 11/2006 | Ruckart |
| 7,152,110 B2 | 12/2006 | Pierce |
| 7,194,257 B2 | 3/2007 | House |
| 7,233,808 B2 | 6/2007 | Mooney |
| 7,236,470 B1 | 6/2007 | Bims |
| 7,243,851 B2 | 7/2007 | Zhu |
| 7,257,372 B2 | 8/2007 | Kaltenbach |
| 2002/0061744 A1 | 5/2002 | Hamalainen |
| 2002/0098878 A1 | 7/2002 | Mooney |
| 2002/0132582 A1 | 9/2002 | Mooney |
| 2002/0160820 A1 | 10/2002 | Winkler |
| 2002/0168939 A1 | 11/2002 | Gioscia |
| 2003/0008679 A1* | 1/2003 | Iwata et al. .................. 455/556 |
| 2003/0035382 A1 | 2/2003 | Jose |
| 2003/0068974 A1* | 4/2003 | Kanamaluru et al. ....... 455/3.06 |
| 2003/0083111 A1 | 5/2003 | Wu |
| 2003/0087667 A1 | 5/2003 | Taniguchi |
| 2003/0091069 A1* | 5/2003 | Kraemer et al. .............. 370/487 |
| 2003/0096576 A1 | 5/2003 | Salonidis |
| 2003/0100274 A1 | 5/2003 | Brown |
| 2004/0001588 A1 | 1/2004 | Hairston |
| 2004/0052382 A1 | 3/2004 | Wang |
| 2004/0087307 A1 | 5/2004 | Ibe |
| 2004/0132509 A1* | 7/2004 | Glezerman ................ 455/575.2 |
| 2004/0137967 A1 | 7/2004 | Bodley |
| 2004/0185919 A1 | 9/2004 | Yoo |
| 2004/0203357 A1 | 10/2004 | Nassimi |
| 2004/0204120 A1 | 10/2004 | Jiles |
| 2004/0224717 A1 | 11/2004 | Hertzberg |
| 2004/0264708 A1 | 12/2004 | Dupeire |
| 2005/0026560 A1* | 2/2005 | Villaverde et al. .......... 455/3.06 |
| 2005/0044372 A1* | 2/2005 | Aull et al. .................... 713/176 |
| 2005/0058313 A1 | 3/2005 | Victorian |
| 2005/0070337 A1 | 3/2005 | Byford |
| 2005/0096096 A1* | 5/2005 | Birli et al. .................. 455/569.1 |
| 2005/0130593 A1 | 6/2005 | Michalak |
| 2005/0136958 A1 | 6/2005 | Seshadri |
| 2005/0202857 A1 | 9/2005 | Seshadri |
| 2005/0265316 A1 | 12/2005 | Liu |
| 2005/0282592 A1 | 12/2005 | Frerking et al. |
| 2006/0062400 A1 | 3/2006 | Chia-Chun |
| 2006/0111044 A1 | 5/2006 | Keller |
| 2006/0166705 A1* | 7/2006 | Seshadri et al. ........... 455/569.1 |
| 2006/0166715 A1* | 7/2006 | Van Engelen et al. ..... 455/575.2 |
| 2006/0166716 A1* | 7/2006 | Seshadri et al. ........... 455/575.2 |
| 2006/0166717 A1* | 7/2006 | Seshadri et al. ........... 455/575.2 |
| 2006/0166718 A1* | 7/2006 | Seshadri et al. ........... 455/575.2 |
| 2006/0193466 A1* | 8/2006 | Rodman .................. 379/406.06 |
| 2006/0194621 A1* | 8/2006 | Seshadri et al. ........... 455/569.1 |
| 2006/0245608 A1 | 11/2006 | Lee |
| 2006/0251277 A1 | 11/2006 | Cho |
| 2006/0252470 A1* | 11/2006 | Seshadri et al. ........... 455/575.2 |
| 2007/0025579 A1* | 2/2007 | Kolton ......................... 381/384 |
| 2009/0318202 A1* | 12/2009 | Bodley ...................... 455/575.2 |

* cited by examiner

WIRELESS HEADSET SUPPORTING ENHANCED CALL FUNCTIONS

CROSS REFERENCES TO RELATED APPLICATIONS

This application claims the benefit of priority under 35 USC §119(e) to U.S. Provisional Patent Application No. 60/645,872 entitled "WIRELESS HEADSET SUPPORTING ENHANCED CALL FUNCTIONS," by Nambirajan Seshadri, et al. filed on Jan. 21, 2005, expired, and is incorporated herein by reference in its entirety for all purposes. This Application is related to the following applications: application Ser. No. 10/981,418 entitled "UNIVERSAL WIRELESS MULTIMEDIA DEVICE," by Nambirajan Seshadri, et al., filed on Nov. 4, 2004, abandoned, which is a continuation-in-part of application Ser. No. 10/856,430 entitled "PROVIDING A UNIVERSAL WIRELESS HEADSET," by Nambirajan Seshadri, et al., filed May 28, 2004, abandoned, which claims priority under 35 USC §119(e) to Provisional Application No. 60/473,967 filed on May 28, 2003, expired; and application Ser. No. 10/981,418 is also a continuation-in-part of application Ser. No. 10/856,124 filed May 28, 2004, abandoned, which claims priority under 35 USC §119(e) to Provisional Application No. 60/473,675 filed May 28, 2003, expired; application Ser. No. 10/976,300 entitled "MODULAR WIRELESS MULTIMEDIA DEVICE," by Nambirajan Seshadri, et al., filed on Oct. 27, 2004, abandoned, which is a continuation-in-part of application Ser. No. 10/856,124 entitled "MODULAR WIRELESS HEADSET AND/OR HEADPHONES," filed May 28, 2004, abandoned, which claims priority under 35 USC §119(e) to Provisional Application No. 60/473,675, filed on May 28, 2003, expired; and application Ser. No. 10/976,300, abandoned, is also a continuation-in-part of application Ser. No. 10/856,430 filed May 28, 2004, abandoned, which claims priority under 35 USC §119(e) to Provisional Application No. 60/473,967 filed May 28, 2003, expired; application Ser. No. 11/120,765 entitled "MODULAR EARPIECE/MICROPHONE THAT ANCHORS VOICE COMMUNICATIONS," by Nambirajan Seshadri, et al., filed on May 3, 2005, pending, which claims priority under 35 USC §119(e) to Provisional Application No. 60/656,828 filed on Feb. 25, 2005, expired; application Ser. No. 11/122,146 entitled "HANDOVER OF CALL SERVICED BY MODULAR EARPIECE/MICROPHONE BETWEEN SERVICING BASE PORTIONS," by Nambirajan Seshadri, et al., filed on May 4, 2005, now issued as U.S. Pat. No. 7,555,318, on Jun. 30, 2009, which claims priority under 35 USC §119(e) to Provisional Application No. 60/653,234 filed on Feb. 15, 2005, expired; application Ser. No. 11/120,900 entitled "MODULAR EARPIECE/MICROPHONE (HEADSET) OPERABLE TO SERVICE VOICE ACTIVATED COMMANDS," by Nambirajan Seshadri, et al., filed on May 3, 2005, now issued as U.S. Pat. No. 7,343,177, on Mar. 11, 2008, application Ser. No. 11/120,903 entitled "BATTERY MANAGEMENT IN A MODULAR EARPIECE MICROPHONE COMBINATION," by Nambirajan Seshadri, et al., filed on May 3, 2005, now issued as U.S. Pat. No. 7,977,115, on Jul. 27, 2006, which claims priority under 35 USC §119(e) to Provisional Application No. 60/646,270 filed on Jan. 24, 2005, expired; application Ser. No. 11/120,904 entitled "PAIRING MODULAR WIRELESS EARPIECE/MICROPHONE (HEADSET) TO A SERVICED BASE PORTION AND SUBSEQUENT ACCESS THERETO," by Nambirajan Seshadri, et al., filed on May 3, 2005, now issued as U.S. Pat. No. 7,778,601, on Aug. 17, 2010, which claims priority under 35 USC §119(e) to Provisional Application No. 60/646,437 filed on Jan. 24, 2005, expired; application Ser. No. 11/120,902 entitled "MANAGING ACCESS OF MODULAR WIRELESS EARPIECE/MICROPHONE (HEADSET) TO PUBLIC/PRIVATE SERVICING BASE STATION," by Nambirajan Seshadri, et al., filed on May 3, 2005, abandoned, which claims priority under 35 USC §119(e) to Provisional Application No. 60/646,235 filed on Jan. 24, 2005, expired; application Ser. No. 11/120,676 entitled "EARPIECE/MICROPHONE (HEADSET) SERVICING MULTIPLE INCOMING AUDIO STREAMS," by Nambirajan Seshadri, et al., filed on May 3, 2005, now issued as U.S. Pat. No. 7,558,529, on Jul. 7, 2009, which claims priority under 35 USC §119(e) to Provisional Application No. 60/646,272 filed on Jan. 24, 2005, expired; application Ser. No. 11/120,455 entitled "INTEGRATED AND DETACHABLE WIRELESS HEADSET ELEMENT FOR CELLULAR/MOBILE/PORTABLE PHONES AND AUDIO PLAYBACK DEVICES," by Josephus A. Van Engelen, et al., filed on May 3, 2005, pending, which claims priority under 35 USC §119(e) to Provisional Application No. 60/646,465 filed on Jan. 24, 2005, expired, all of which are incorporated herein by reference in their entirety for all purposes.

BACKGROUND OF THE INVENTION

1. Field of the Invention

This invention generally relates to wireless communications and more particularly to a modular wireless multimedia device operable to support enhanced call functions.

2. Background of the Invention

Wireless communications offer users the ability to be "wired" from almost anywhere in the world. Cellular telephones, satellite telephones, wireless local area networks, personal digital assistants (PDAs) with radio frequency (RF) interfaces, laptop computers with RF interfaces and other such devices enable these wireless communications. Such wireless communications have been extended to personal wireless networks, such as these defined by the Bluetooth specification. Not only have cellular telephones become very popular, but Wireless Local Area Networking (WLAN) devices have also proliferated. One standard for wireless networking, which has been widely accepted, is the Specification of the Bluetooth System, v. 1.0 ("Bluetooth Specification").

The Bluetooth Specification enables the creation of small personal area networks (PAN's) where the typical operating range of a device is 100 meters or less. In a Bluetooth system, Bluetooth devices sharing a common channel sequence form a piconet. Two or more piconets co-located in the same area, with or without inter-piconet communications, is known as a scatternet.

The Bluetooth Specification supports voice communications between Bluetooth enabled devices. When a pair of Bluetooth devices supports voice communication, the voice communications must be wirelessly supported in a continuous fashion so that carried voice signals are of an acceptable quality. One popular use of personal wireless networks couples a wireless headset(s) with cellular telephone(s), personal computer(s), and laptop(s), etc. The Bluetooth Specification provides specific guidelines for providing such wireless headset functionality.

Bluetooth provides a headset profile that defines protocols and procedures for implementing a wireless headset to a device private network. Once configured, the headset functions as the device's audio input and output. As further defined by the Bluetooth Specification, the headset must be able to send AT (Attention) commands and receive resulting codes, such that the headset can initiate and terminate calls. The Bluetooth Specification also defines certain headset profile restrictions. These restrictions include an assumption that the ultimate headset is assumed to be the only use case active between the two devices. The transmission of audio is based on continuously variable slope delta (CVSD) modulation. The result is monophonic audio of a quality without perceived audio degradation. Only one audio connection at a time is supported between the headset and audio gateway. The audio gateway controls the synchronous connection orientated (SCO) link establishment and release. The headset directly connects and disconnects the internal audio stream upon SCO link establishment and release. Once the link is established, valid speech exists on the SCO link in both directions. The headset profile offers only basic inoperability such that the handling of multiple calls or enhanced call functions at the audio gateway is not supported. Another limitation relates to the manner which Bluetooth devices service only single channel audio communications. In most cases, the Bluetooth device is simply a replacement for a wired headset. Such a use of the Bluetooth device, while providing benefits in mobility of the user, provides little additional benefit over wired devices. Because other wireless solutions provide many of the benefits that current Bluetooth devices provide in servicing voice communications, the needs for the complexities of the Bluetooth Specification are questioned.

Thus, there is a need for improved operations by WLAN devices servicing audio or multimedia communications that provide additional user functionality and improved service quality.

BRIEF SUMMARY OF THE INVENTION

The wireless multimedia device of the present invention substantially meets these above-identified needs and others. One embodiment provides a wireless earpiece/microphone operable to support enhanced call functions. More specifically, this wireless headset supports voice communications over multiple servicing networks. The wireless headset includes a wireless earpiece, a wireless microphone, and a user interface wherein either the earpiece or microphone are a detachable module. The wireless earpiece may receive radio frequency (RF) signals and render voice communications contained within the received RF signals audible. This wireless earpiece further includes a wireless interface to receive and transmit the RF signals between the earpiece and a host device. Processing circuitry operably coupled to the wireless interface recovers digital audio signals from the received RF signals. A digital-to-analog converter (DAC) couples to the wireless interface and processing circuitry. The DAC produces analog audio signals from the digital audio signals and provides this analog audio signal a speaker module which receives the analog audio signal and renders the stat communications contained therein audible. The wireless microphone captures audio signals and converts the audio signals into RF signals. This modular wireless microphone further includes a microphone transducer to capture the audio signals and convert the captured audio signals into analog audio signals. An analog-to-digital converter (ADC) receives the analog audio signals and produces a digital audio signal. Processing circuitry processes the digital audio signals to produce RF signals which are transmitted by a wireless interface contained within the modular wireless microphone. A user interface couples to the wireless earpiece and/or wireless microphone and is operable to initiate enhanced call functions based upon user input.

This headset couples wirelessly to a host device. This host device allows a logical connection communication pathway between the wireless headset and servicing networks. As previously stated, the user interface of the headset allows enhanced call functions to be initiated. These enhanced call functions may include network interface functions, base unit interface functions, directory functions, caller ID functions, voice activated commands, call waiting functions, call conferencing functions, call initiation functions device programming functions and other like functions known to those skilled in the art. The user interface may be either a visual, tactile, and/or audio interface. When the user interface is a tactile interface, one touch buttons, are operable to initiate the advance call functions. Similarly, when an audio interface is employed, a voice recognition system, which may be located within the wireless headset, may operate to recognize and act upon voice commands.

Another embodiment provides a method to service voice communications between a servicing network and a wireless multimedia device. Servicing these communications involves exchanging RF signals between a host device and the wireless multimedia device. These exchanged RF signals may contain communications having audio, video, text, and data information. The wireless multimedia device, when receiving inbound RF signals, extracts the digital communications from the RF signal and converts the digital signals into signals to be presented to a user. This may include, for example, voice signals that are then rendered audible with the earpiece. A wireless microphone may capture voice communications with a microphone transducer. These voice communications may then be converted to outbound digital voice communications. Outbound digital voice communications are then processed and transmitted from the modular wireless headset to the host device via the wireless interface. Additionally, enhanced call functions associated with these exchanged communications may be initiated through a user interface operably coupled to either the modular wireless earpiece or microphone. This user interface may exchange visual, tactile, or audio information with the user. These advance call functions include but are not limited to the previously identified enhanced call functions. Additionally, the user interface may also allow the user to validate and authenticate the use of the modular wireless headset with the servicing network or host device.

Another embodiment includes earpiece(s) and microphone(s), wherein the earpiece(s) are physically separate from the microphone(s). The earpiece(s) are operable to render inbound audio communications contained within RF signals received from a host device audible. To do this, the earpiece includes a receiver module, a data recovery module, and a speaker module. The receiver module converts inbound RF signals into low intermediate frequency (IF) signals. The data recovery module then recovers audio signals from the low IF signals. The speaker module renders these signals audible. The microphone converts received audio signals into outbound RF signals, where the outbound RF signals are transmitted to the host device (e.g., cellular telephone, personal computer, laptop computer, personal digital assistant, wire line telephone, etc.). The microphone includes, at least, an audio input module and a transmitter module. The audio input module converts received analog audio signals into digital audio signals. The transmitter module then converts the digital audio signals into the outbound RF signals.

Another embodiment provides a method for wireless communications within a piconet. This method includes a modular wireless multimedia device and a host device. Those devices first established a piconet or wireless connection Processing continues by transmitting outbound RF signals from individual wireless modular devices such as a microphone module to the host device via a wireless communication resource(s). The processing also includes transmitting inbound RF signals from the host device to the individual wireless modular devices such as an earpiece module via wireless communication resource. Enhanced call functions are initiated through a user interface located on either or both the earpiece or microphone.

The host device may be operable to generate inbound RF signals from playback baseband signals (e.g., digital audio, video, text or data signals produced by a CD player, DVD player, et cetera). The host device provides the playback baseband signals to the appropriate modular device via a physical connection when the detachable earpiece is physically coupled to the host module. Alternatively, the host device may provide inbound RF signals to the detachable modules via a wireless communication resource when the detachable modular devices are not physically coupled to the host module. The modular communication device may further include a detachable microphone module, video play, text display, or intelligent whiteboard. The host module may receive audio record baseband signals via a physical connection from the microphone module when the microphone module is physically coupled to the host module. When the microphone module is not physically coupled to the host module, the detachable microphone module converts the audio record baseband signals into outbound RF signals and provides the outbound RF signals to the host module via wireless communication resource(s). The user interface in this case may initiate network functions, playback commands or record commands.

To render stereo or multi-channel audio, additional earpieces may be utilized. Each of the wearable earpieces is operably coupled to render inbound signals received from a host device into audible signals.

Each of these various embodiments provides separate components of a headset and/or headphones. With separate earpieces and/or microphones, various physical embodiments of the earpieces and/or microphones may be generated. The components, when worn, are less conspicuous than previous integrated headsets and are more comfortable to wear. For instance, the earpieces may be form fitted to an individual's ear, contain an eyeglass clip-on piece, etc.

Other features and advantages of the present invention will become apparent from the following detailed description of the invention made with reference to the accompanying drawings.

DETAILED DESCRIPTION OF THE INVENTION

Figure 1:
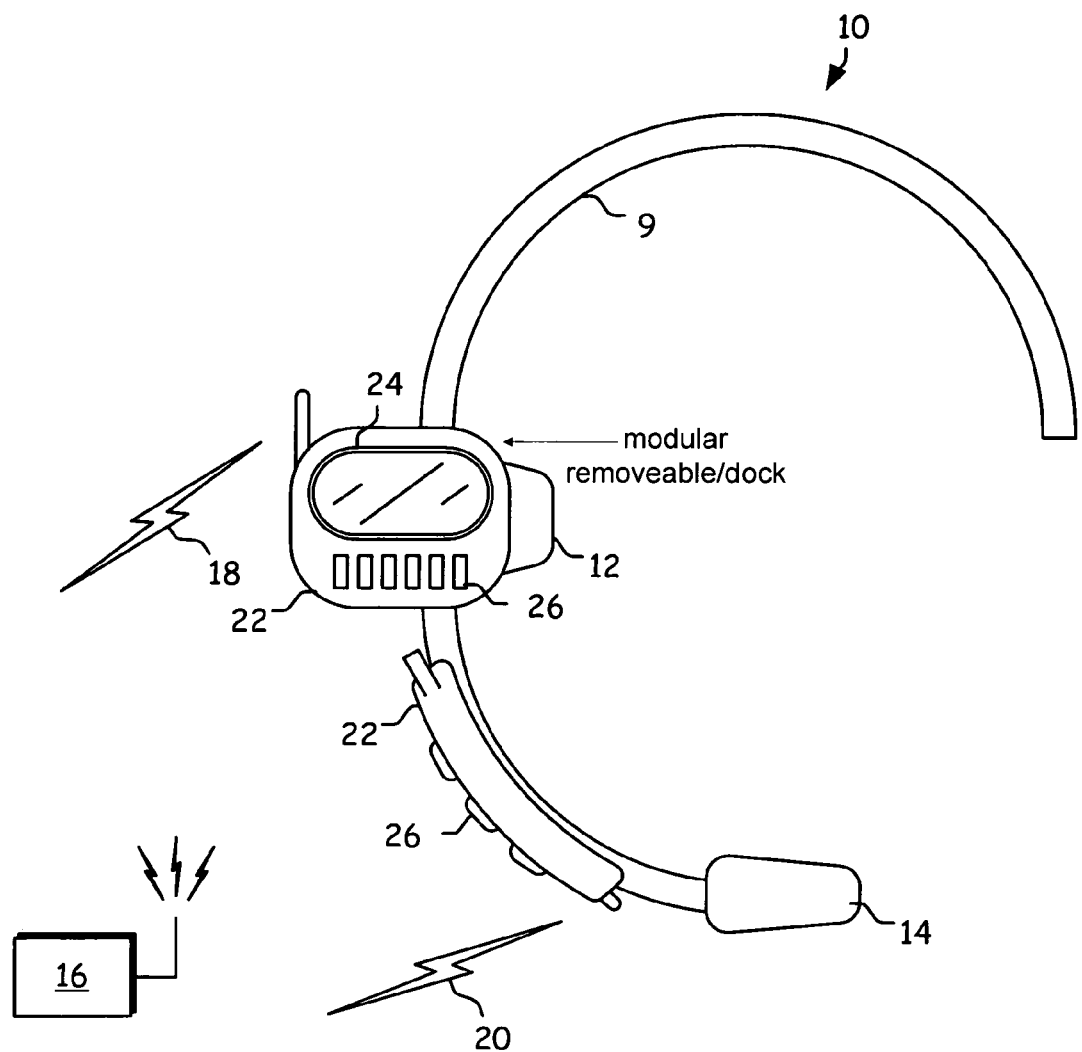
FIG. 1 is a diagram of a wireless headset in accordance with the present invention.

FIG. 1 is a diagram of a modular wireless headset 10 wirelessly coupled to host device 16 that includes earpiece 12 and microphone 14. Earpiece 12 may be a separate physical device from microphone 14. Earpiece 12 may be detached from the headset. Headset 10 may include a frame 9 that conforms to the shape of the user's head. This frame may be formed from shaped batteries and may physically dock to the earpiece and microphone. Accordingly, earpiece 12 and microphone 14 may be separate communication devices that individually communicate with host device 16 via separate communication pathways. As shown, earpiece 12 may communicate with host device 16, which may be a cellular telephone, wire line telephone, laptop computer, personal computer, personal digital assistant, etc., using transceiver (or receiver) 13 of FIG. 2 via a first communication pathway 18. Although shown as being external to earpiece 12, transceivers 13 and 15 may be integrated within earpiece 12 and microphone 14. Host device 16 is operable to establish a wireless pathway to earpiece 12 or microphone 14. The microphone 14 may communicate with the host device 16 using transceiver (or transmitter) 15 of FIG. 2 via a second communication pathway 20. Microphone 14 may also be detachable mounted on a frame similar to form and function to frame 9. Either or both earpiece 12 and microphone 14 may have a user interface 22. If the communication pathways are established in accordance with the Bluetooth specification, communication resources 18 and 20 may be different timeslot allocations on the same synchronous connection orientated (SCO) link, or may be separate SCO links.

User interface 22 allows a user to initiate enhanced call functions or network hardware operations. These enhanced call functions include call initiation operations, call conferencing operations, call forwarding operations, call hold operations, call muting operations, and call waiting operations. Additionally, user interface 22 allows the user to access network interface functions, hardware functions, base unit interface functions, directory functions, caller ID functions, voice activated commands, playback commands and device programming functions. User interface 22 can be any combinations of a visual interface as evidenced by display 24, tactile interface as evidenced by buttons 26, and/or an audio interface. Each of these devices, earpiece 12, microphone 14 and host device 16, may support one or more versions of the Bluetooth Specification or other wireless protocols. A Bluetooth "scatternet" is formed from multiple "piconets" with overlapping coverage.

A user of wireless headset 10 may establish communications with any available host device in a piconet. Wireless headset 10 may have a minimal user interface 22 where a single authenticate button 26 initiates joining of a piconet. Wireless headset 10 may reside within the service coverage area of each of multiple host devices. Thus, when wireless headset 10 enters (or powers up in) an area with more than one functioning piconets, a user may depress authenticate button 26, use a voice command or other means to start the authentication process. With the authenticate button depressed, the wireless headset attempts to establish a piconet with host device 16. Subsequent authentication operations are required to have the wireless headset join the selected piconet. These subsequent authentication operations may include prompting the user for selection of the piconet, requiring that an entry be previously made in an access list to allow wireless headset 10 to join the piconet, or other complete authentication operations.

Once wireless multimedia device or headset 10 joins a respective piconet, wireless multimedia device or headset 10 establishes an audio link with the host device via respective WLAN links. Such calls will be received and managed by host device 16 or multimedia device or headset 10. Management duties for the calls may be divided between host device 15 and multimedia device or headset 10. Integrated circuit in either headset 10 or host device 16 support enhanced call functions. These enhanced call functions include but are not limited to call conferencing operations, call forwarding operations, call hold operations, call muting operations, or call waiting operations, and may be initiated through user interface 22.

Figure 2:
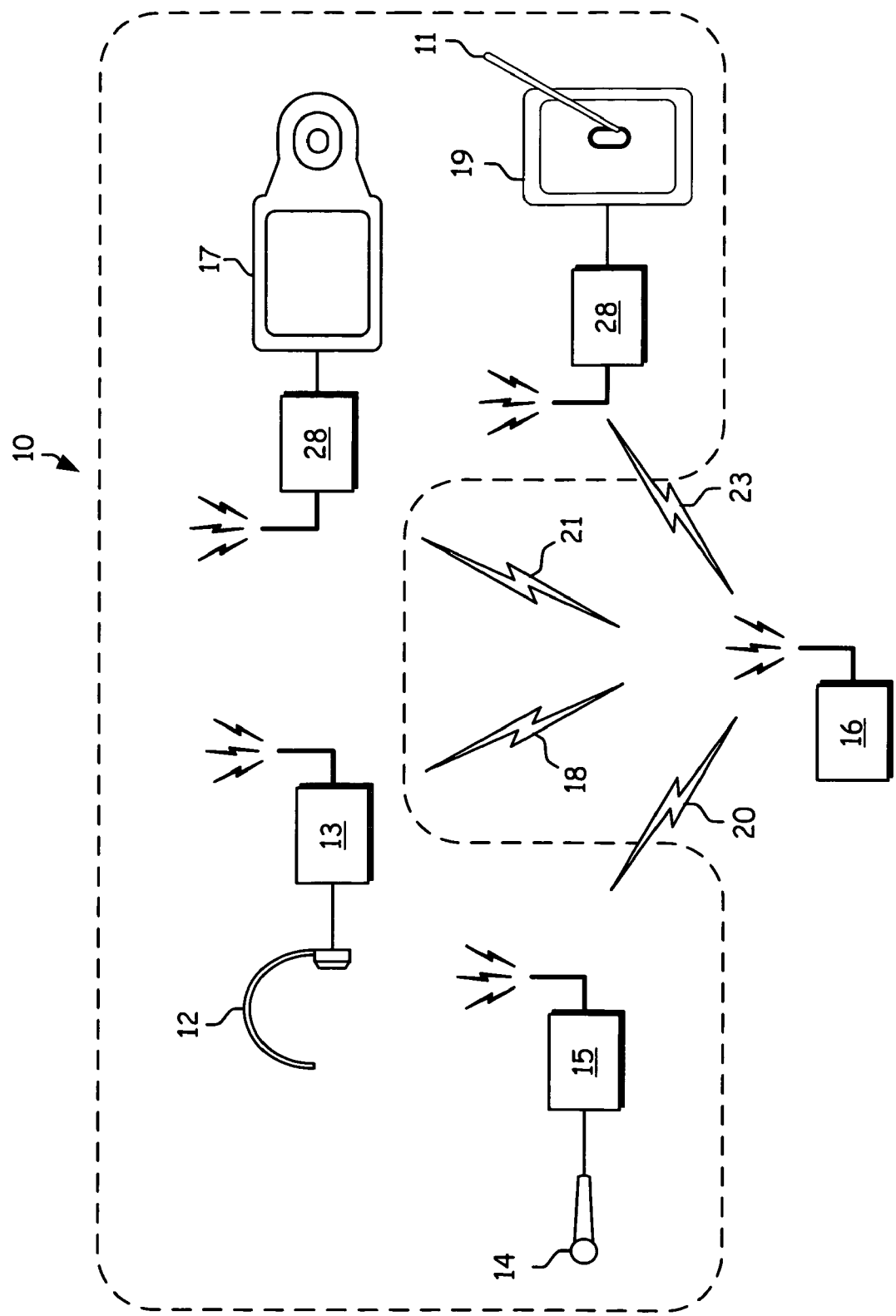
FIG. 2 is a diagram of another modular wireless multimedia device in accordance with the present invention.

FIG. 2 is a diagram of a wireless headset that includes an earpiece 12, a microphone 14, as well as optional display/camera 17, and a portable touch-screen/whiteboard 19. Microphone 14, earpiece 12, display/camera 17 and portable touch-screen/whiteboard 19 may each be a separate physical device. Earpiece 12 may be a separate device from microphone 14, that together function to provide the optionally modular wireless headset shown in FIG. 1. Accordingly, earpiece 12, microphone 14, display/camera 17, and a portable touch-screen/whiteboard 19 are separate communication devices that may individually communicate with host devices via separate or shared communication pathways. A single communication pathway using time division may be used to communicate between earpiece 12, microphone 14, display/camera 17, portable touch-screen/whiteboard 19 and host devices 30-37 or access point 21. This communication may be secured by encryption, validation, or other like methods known to those skilled in the art and may support one-way or two-way audio, video or text communications. One way communications allow the devices to act as receivers to broadcast information, while two-way communications allow real-time audio or video communications such as phone or radio communications which may be augmented with data and text to support interactive net meetings.

Figure 3:
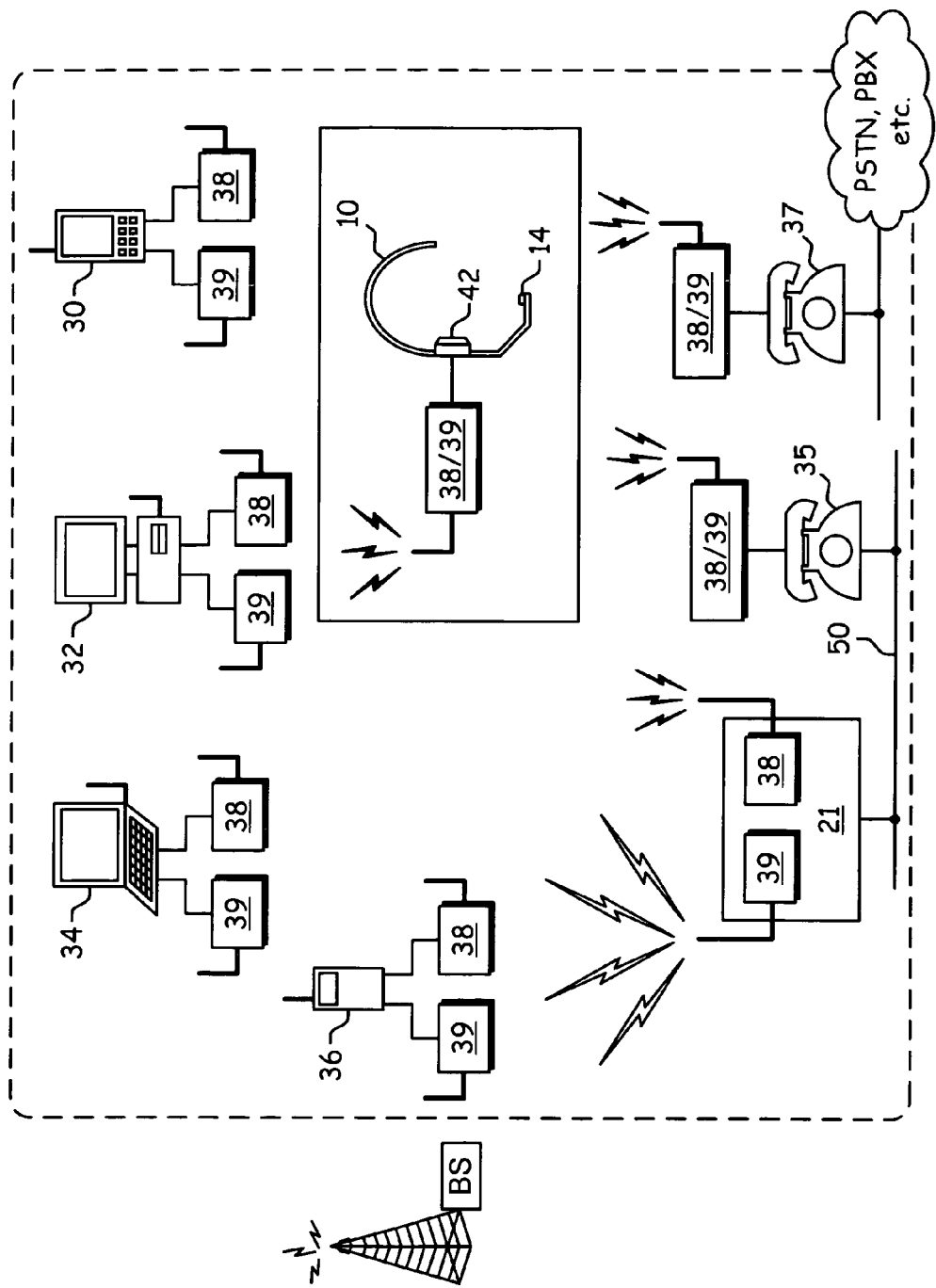
FIG. 3 is a diagram of a wireless multimedia device operable to couple to various host devices in accordance with the present invention.

Earpiece 12, once authorized or validated, may communicate with host device 16, which FIG. 3 depicts as a cellular telephone, wire line telephone, Ethernet telephone, laptop computer, personal computer, personal digital assistant, etc, using transceiver (or receiver) 13 via a first communication pathway 18. Host device 16 is operable to establish a wireless pathway to earpiece 12 or microphone 14. The microphone 14, once authorized or validated, may communicate with the host device 16 using transceiver (or transmitter) 15 via a second communication pathway 20. Display/camera 17 and portable touch-screen/whiteboard 19 may communicate with the host device 16 using transceivers (or transmitters) 25 and 27 via communication pathways 21 and 23 respectively.

If the communication pathways are established in accordance with the Bluetooth specification, communication resources may be different timeslot allocations on the same synchronous connection orientated (SCO) link, or may be separate SCO links. These communication pathways may be secured by encryption, validation, pairing, or other like means to secure the communications exchanged with the host device. Validation or pairing may prevent unauthorized devices from communicatively coupling to the host device.

The quality of data provided to these devices may be adjusted according to which devices are actually present and supported. For example, audio quality can be improved and may even support stereo. This option may limit resources provided to microphone 14, display/camera 17, or whiteboard 19 to service multi-channel audio. Another example may favor the use of only earphone 12 and display/camera 17 to view streamed video and audio content. To coordinate the presentation of both audio and video in such an example, the earphone 12 and display/camera 17 and their received communications may be synchronized to provide a quality viewing experience. Similarly, to coordinate the presentation of multiple audio channels, earphones 12 may be synchronized in order to provide a quality experience. To coordinate the presentation of real-time two-way audio earphones 12 and microphone 14 may be synchronized such that unacceptable delays do not exist within exchanged voice communications. This coordination ensures there is no undue delay between the presentations provided by these individual devices allowing the user to perceive a seamless presentation. This embodiment allows the multimedia device to support net-meetings that require the delivery of complete Internet conferencing solutions with multi-point data conferencing, text chat, whiteboard, and file transfer, as well as point-to-point audio and video. Additionally, this allows the multimedia device to coordinate the presentation of these different media formats without necessarily requiring shared physical connections of these devices.

Direct connectivity previously limited the physical structure that could be used for a wireless headset or multimedia devices that supports net-meetings. In many cases, this results in headsets or multimedia devices that are cumbersome to use and uncomfortable to wear. The protocol used between host devices, access points and other communicatively coupled devices may allow the host device or access point to send data to each device in a coordinated manner that allows for the synchronized presentation of multimedia content by the devices. For example, one embodiment may allocate a predetermined portion of each data transmission for each media format. This would allow host device 16 to transmit the same data to each device, wherein each device only processes that content intended for that device. In another embodiment, host device or access point communicates in parallel with each device. By coordinating the data or packets exchanged with the devices, their individual presentations may be synchronized.

Earpiece 12 and microphone 14 may have on-chip operations to support call conferencing, call waiting, flash, and other features associated with telephones or net-meetings. These functions may me accessed and reviewed by a user interface and display within the host device or a user interface and display located on or coupled to either earphone 12 or microphone 14. The user interface and display, located on or coupled to either the host device or earphone 12 or microphone 14 may have a display and button(s) that may be used to program device, perform directory functions including selecting number to call, view caller ID, initiate call waiting, or initiate call conferencing. Additionally, circuitry within earphone 12 or microphone 14 may enable voice activated dialing. The actual voice recognition could be performed within earphone 12, microphone 14, or a host device. Thus, earphone 12 or microphone 14 may act to initiate calls and receive calls. A link between earphone 12 and microphone 14 would allow earphone 12 or microphone 14 to share resources, such as batter life, and allow earphone 12 or microphone 14 to be recharged from a host device.

Each of the devices 30-37 also includes piconet RF interface 38 and/or wireless interface 39. Piconet RF interface 38 may be constructed to support one or more versions of the Bluetooth specification. As such, each of the piconet RF interfaces 38-39 include a radio frequency transceiver that operates at 2.4 gigahertz and baseband processing for modulating and demodulating data that is transceived within a piconet. As such, universal wireless multimedia device 10 may be wirelessly coupled with any one of the devices 30-37 and act as the headset communicatively coupled to the devices 30-37. Headset 10 may simultaneously service common earpieces with multiple devices or audio sources. In this way, certain enhanced call functions may be both two-way audio communication and other audio streams.

Devices 30-37 may further include a wireless LAN (WLAN) RF interface 39. The wireless LAN RF interfaces 39 may be constructed in accordance with one or more versions of IEEE802.11 (a), (b), and/or (g) or other WLAN protocol known to those skilled in the art. Accordingly, each of the WLAN RF interfaces 39 include an RF transceiver that may operate in the 2.4 gigahertz range and/or in the 5.25 or 5.75 gigahertz range and further includes baseband processing to modulate and demodulate data that is transceived over the corresponding wireless communication link.

Contrasting the functionality of the piconet RF interfaces with the WLAN RF interfaces, the piconet RF interfaces allow point-to-point communication between the associated devices, while the WLAN RF interfaces enable the associated devices to communicate indirectly via access point 21. For example, via piconet RF interfaces 38 laptop 34 can communicate directly with cellular telephone 36. In contrast, via WLAN RF interfaces 39, laptop 34 communicates indirectly, via access point 21, with cellular telephone 36. In general, the coverage area of a piconet is significantly smaller than the coverage area of a WLAN. Thus, for example, if laptop 16 and cellular telephone 36 were unable to establish a piconet connection via piconet RF interfaces 38 due to distance between the devices, they would be able to establish a wireless communication link via the WLAN RF interfaces 39 and access point 21. Dual communication pathways would allow communications to be switched between these communication pathways, dependent on factors such as audio quality, signal strength, and available bandwidth.

Universal wireless multimedia device 10 may establish a piconet with any one of the devices 30-37 or with access point 21, which includes WLAN RF interface 40 and piconet RF interface 38. As such, universal wireless multimedia device 10 may function as the headset for wire line telephone 37, Ethernet telephone 35, personal digital assistant 30, personal computer 32, laptop computer 34 and/or cellular telephone 36 provided a piconet can be established with the device. In accordance with the present invention, if a piconet cannot be established with the particular device, an extended network may be created utilizing the WLAN connectivity and at least one corresponding piconet.

For example, if a communication is to be processed via wire line telephone 14 (i.e., the host device for this example), but headset 10 is at a distance such that a piconet cannot be established between their piconet RF interfaces 26 and 28. However, for example, multimedia device or headset 10 is in a range to establish a piconet with cellular telephone 36. In this instance, the piconet RF interfaces 36 and 28 of cellular telephone 36 and multimedia device or headset 10, respectively, would establish a piconet, which may be established in accordance with the Bluetooth specification. With this piconet established, cellular telephone 36, via its WLAN RF interface 48, establishes a wireless connection with access point 21. Access point 21 then establishes a communication link with wire line telephone 14. Thus, a logical connection is established between universal wireless multimedia device 37 and wire line telephone 37 via cellular telephone 36 and access point 21. Note that wire line telephone 37 may be directly coupled to LAN connection 50 or coupled to a private branch exchange, which in turn is coupled to access point 21. Accordingly, within a wireless geographic area, the range of universal wireless multimedia device 10 may be extended utilizing the WLAN within the geographic area. As such, universal multimedia device or headset 10 extends the mobility of its user, extends the range of headset use and expands on headset functionality. Alternatively, universal wireless multimedia device 10 may establish a piconet with cell phone 36. This allows cell phone 36 to establish an alternate communication pathway for the communications serviced by wired phone 14. Then it is possible for the call serviced by telephone 37 or 35 to be "handed off" to cell phone 36.

Figure 4:
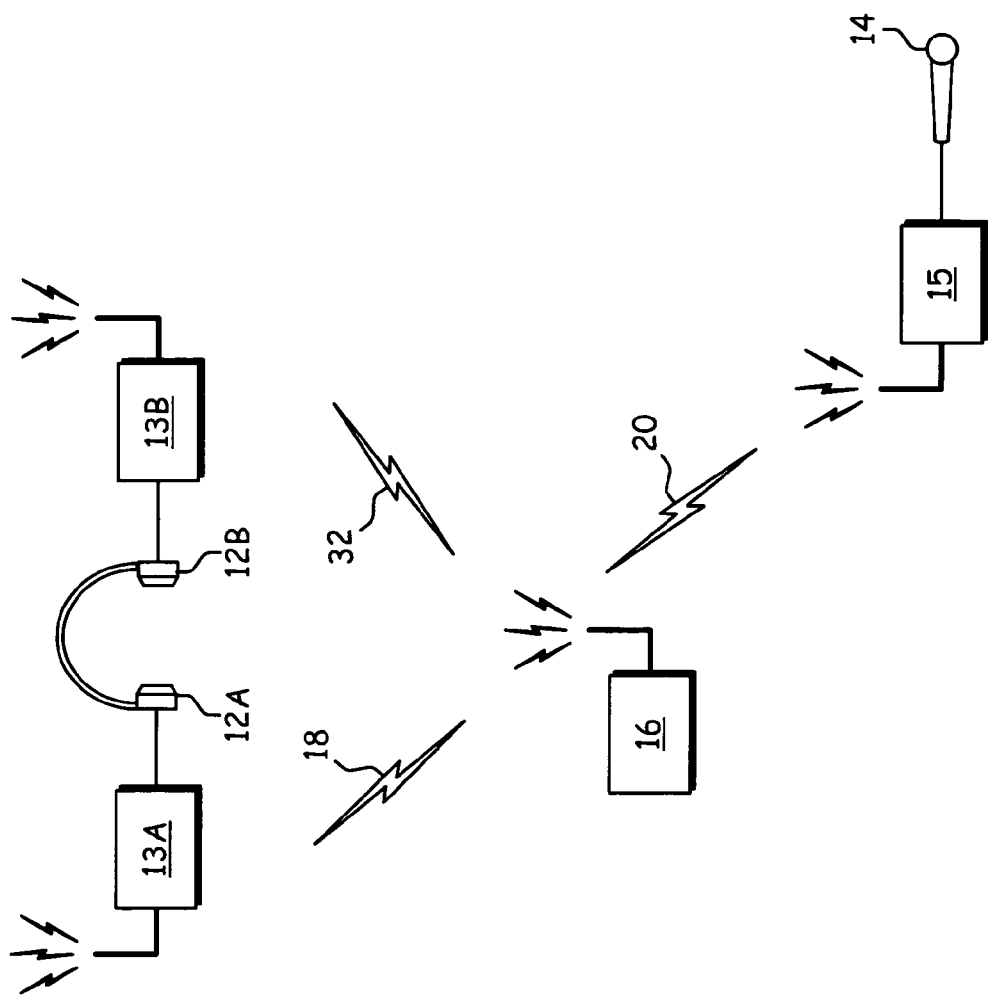
FIG. 4 is a schematic block diagram of a multi-channel wireless headset in accordance with the present invention.

FIG. 4 is a diagram of another embodiment of a modular wireless headset 10 that includes two earpieces 12A and 12B, and microphone 14, and user interface 22. In this configuration, microphone 14 communicates with host device 16 via communication pathway 20, earpiece 12A communicates with host device 16 using transceiver (or receiver) 13A via communication pathway 18 and earpiece 12B communicates with host device 16 using transceiver (or receiver) 13B via communication pathway 32.

In operation, voice produced by the individual using microphone 14 is received via microphone 34 and converted into RF signals by circuitry within microphone 14. These RF signals are provided to host device 16 via communication pathway 20. Host device 16 includes a corresponding receiver antenna 34 and receiver module 36 to recapture the audio signals received via communication pathways 18, 20 and 32. In addition, host device 16 includes at least one transmitter 38 to transmit audio information to the earpiece(s) 12A and 12B. In one embodiment, host device 16 may transmit left channel stereo information to earpiece 12 and right channel stereo information to earpiece 12B.

Wireless headphone(s) may be realized by omitting microphone 14 and including either one or both of earpieces 12A and 12B. In this embodiment, host device may be a playback device such as a CD player, DVD player, cassette player, etc. operable to stream audio information. If the display of FIG. 2 is utilized as well, both streaming audio and video may be enjoyed by the user. The headphone(s) may also be detached from the headset framework in order to serve as a modular playback or audio device.

Figure 5:
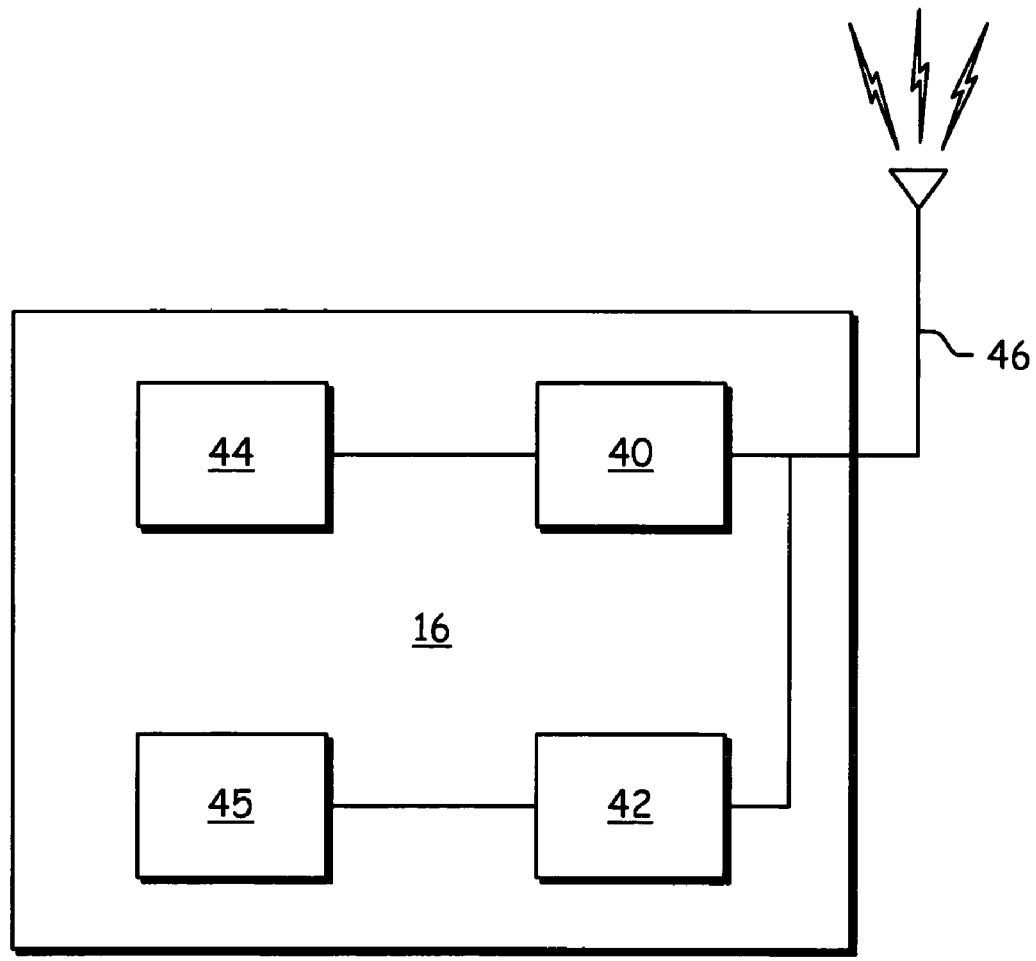
FIG. 5 is a schematic block diagram of an access point in accordance with the present invention.

FIG. 5 is a diagram of host device that supports modular wireless multimedia devices. Host device 16 includes a combination of transmitter and receiver (or transceiver) modules that accept and modulate or demodulate streamed audio, video, text, or data to and from earpiece(s) 12 and microphone 14, display 17 and whiteboard 19 through antenna 46. The host device may be incorporated within or operably couple to another device such as a playback device, laptop, cellular telephone, land based telephone or other like device known to those skilled in the art. For example, one embodiment has transmitter module 40 and receiver module 42. Transmitter module 40 accepts unmodulated streamed audio, video, data or text from playback type device 44 (e.g., DVD player, MP3 player, CD player, cassette player, or other like devices known to those skilled in the art). Playback device 44 may be integrated within host device 16. Transmitter module 40 then modulates the streamed audio into low intermediate frequency (IF) signal. In the case where two earpieces are employed, multiple transmitter modules or time separation may be employed to modulate the streamed audio into low IF signals for the earpieces for each channel (i.e. left and right channels of stereo transmissions. These multiple signals are synchronized in their presentation to a user. Similarly, receiver module 42 accepts modulated streamed audio, video, data or text from multimedia device 10. Receiver module 42 recovers signals from the received low IF signals. The recovered signals are then relayed to receiving presentation device 45. Note that the generation of low IF signals and subsequent demodulation to recapture audio signal may be done in accordance with a particular wireless communication standard. For example, the Bluetooth specification may be used, IEEE802.11 (a), (b), and/or (g) may also be used, etc. when host device 16 couples to a telephone network (PSTN, cellular, satellite, WLAN, VoIP, etc.). Host device 16 may receive data associated with the command as well. For example, caller ID information may be passed to user interface 22 or enhanced call operations may be initiated based on input received at the user interface.

Figure 6:
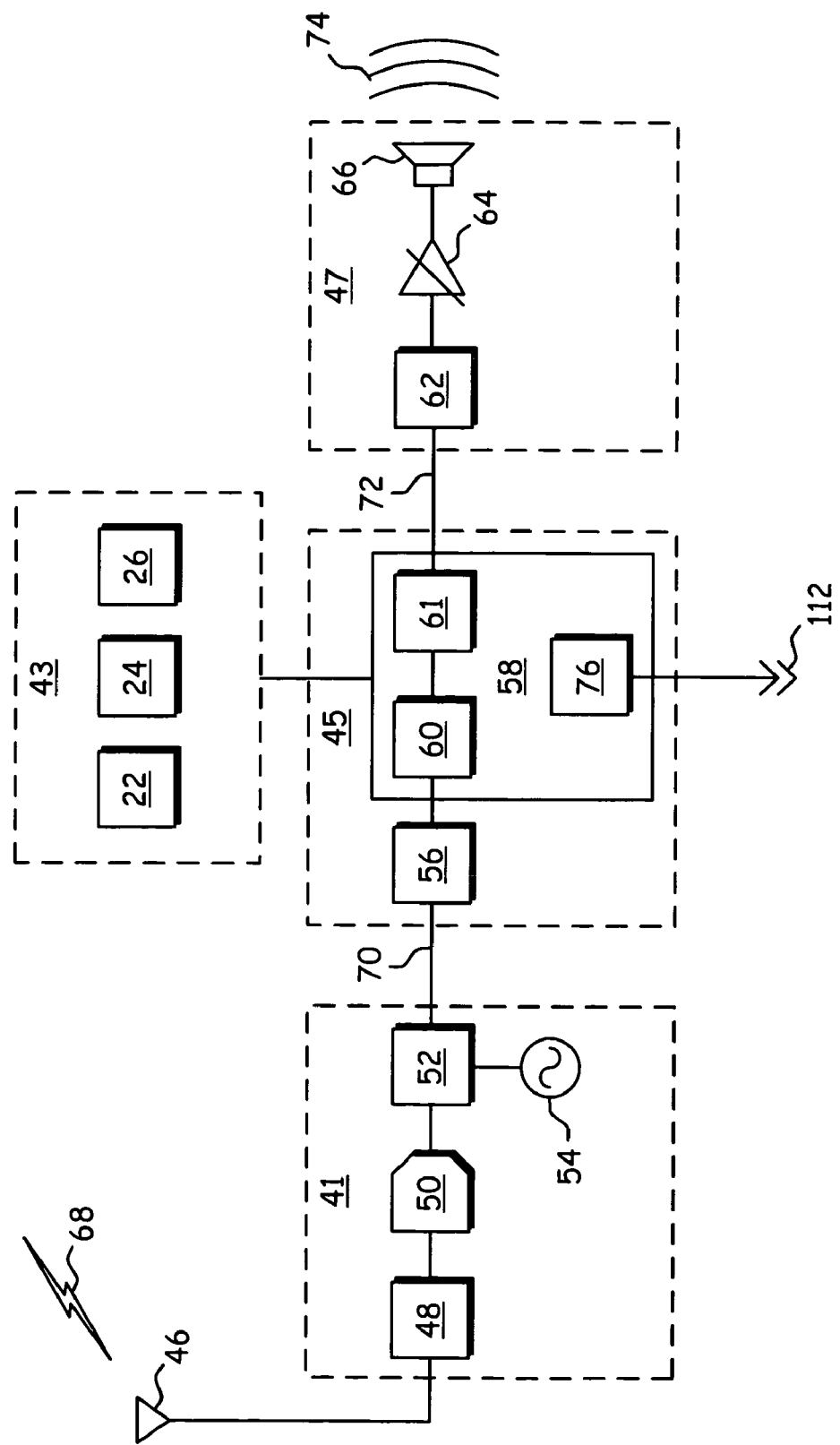
FIG. 6 is a schematic block diagram of wireless earpiece in accordance with the present invention.

FIG. 6 is a schematic block diagram of earpiece 12. Earpiece 12 includes receiver module 41, optional user interface 43, data recovery module 45 and speaker module 47. One embodiment of receiver module 40 includes antenna 46, bandpass filter 48, low noise amplifier 50, down converter 52 and local oscillator 54. User interface 43 can be any combinations of a visual interface as evidenced by display 22, tactile interface as evidenced by buttons 26, and/or an audio interface represented by microphone/speaker and may operably couple to processing module 58 to initiate enhanced call functions which will be described further in FIG. 10.

Data recovery module 45 may include an analog-to-digital converter (ADC) 56 and processing module 58. Processing module 58, which may have associated memory, is configured to provide digital channel filter 60, demodulator 61 and setup module 76. Speaker module 47 includes a digital-to-analog converter (DAC) 62, variable gain module 64, and at least one speaker 66.

Once the piconet is configured (which will be described subsequently), receiver module 41 receives inbound RF signal 68 from host device 16 via antenna 46. Bandpass filter 48 filters the received RF signal 68 which are subsequently amplified by low noise amplifier 50. Down converter 52 converts the filtered and gained RF signal 68 into low intermediate frequency (IF) signal 70 based on a local oscillator 54. Low IF signals 70 may have a carrier frequency at DC ranging to a few megahertz.

Data recovery module 45 receives low IF signals 70 and converts the low IF signals 70 into digital signals via ADC 56. Processing module 58 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory (not shown) may be a single memory device or a plurality of memory devices. Such a memory device may be a read-only memory, random access memory, volatile memory, non-volatile memory, static memory, dynamic memory, flash memory, and/or any device that stores digital information. Note that when processing module 58 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

Digital channel filter 60 receives the digital low IF signals 72 and filters these signals. Demodulator 61 recovers audio signals 74 from the filtered low IF signals. Note that the generation of RF signal 68 and subsequent demodulation to recapture audio signal 74 may be done in accordance with a particular wireless communication standard. For example, the Bluetooth specification may be used; IEEE802.11 (a), (b), and/or (g) may also be used, etc.

Speaker module 47 converts digital audio signal 74 into analog signals provided to the user through speakers 66. Adjustable gain module 64 adjusts the gain (i.e., adjusts volume), and provides the gained signals to speaker 66, which produces audible signals 74. As long as the piconet remains in place between earpiece 12 and host device 16, earpiece 12 will produce audible signals 74 from received inbound RF signal 68.

Figure 7:
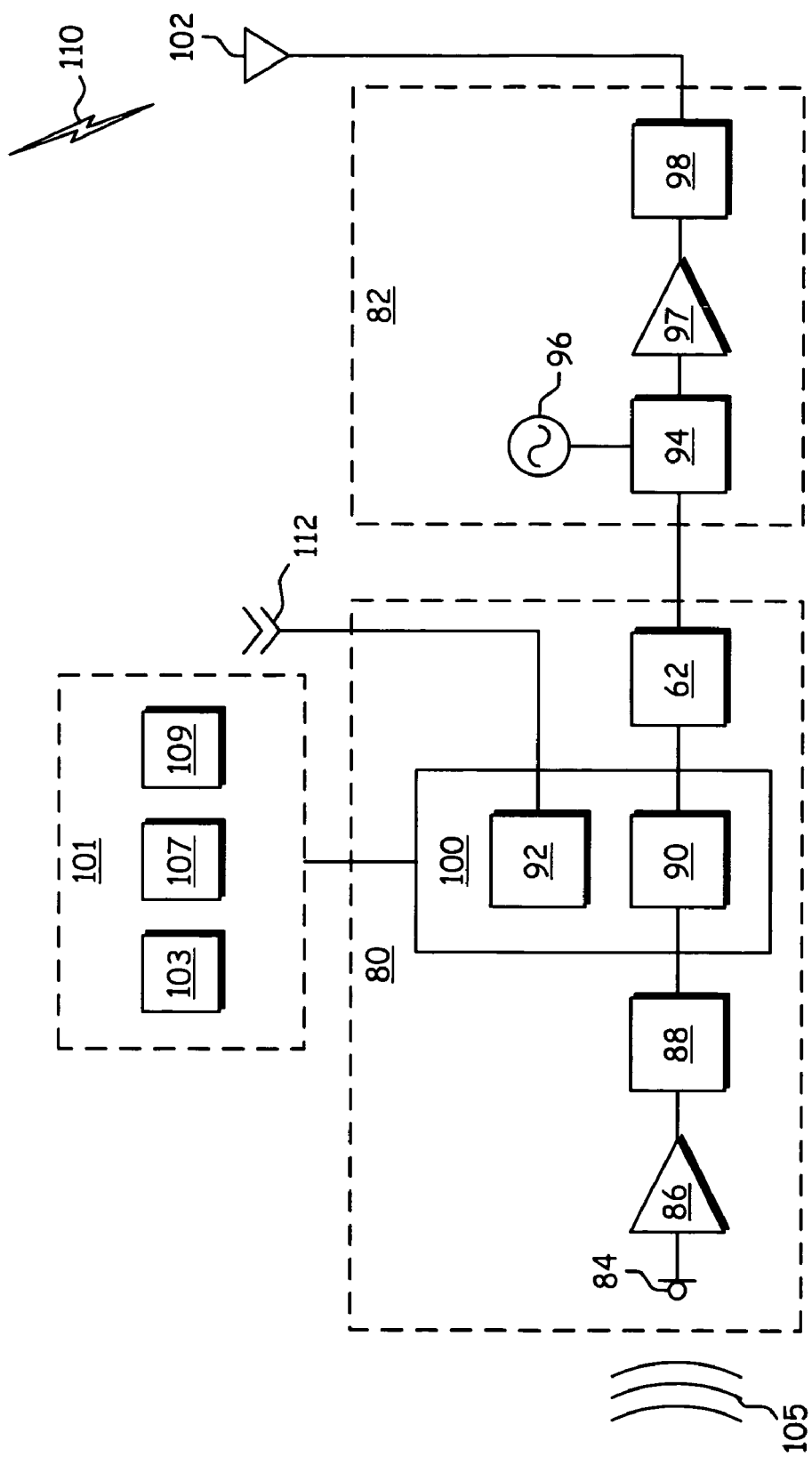
FIG. 7 is a schematic block diagram of a wireless microphone in accordance with the present invention.

FIG. 7 is a schematic block diagram of microphone 14 that includes audio input module 80, transmitter module 82 and user interface 101. Audio input module 80 includes microphone 84, amplifier 86, ADC 88, processing module 100 that is configured to provide a setup module 92 and modulator 90, and DAC 62. User interface 101 can be any combinations of a visual interface as evidenced by display 103, tactile interface as evidenced by buttons 107, and/or an audio interface represented by microphone/speaker 109 and may operably couple to processing module 100 to initiate enhanced call functions which will be described further in FIG. 10. Transmitter module 82 includes up-converter 94, local oscillator 96, power amplifier 97, bandpass filter 98, and antenna 102.

Once microphone 14 is configured within a piconet, microphone 84 is operably coupled to receive audio signals 105 and convert these signals to analog signals 106. Amplifier 86 amplifies analog audio signals 106 to produce amplified signals. ADC 88 then converts the amplified signals into digital audio signals 108. Modulator 90 modulates the digital signals based on a communication standard into modulated signals. As shown, modulator 90 and setup module 92 are implemented within processing module 100. Processing module 100 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

Up-converter 94 converts modulated signals 110 into RF signals based on local oscillator 96. Power amplifier 97 amplifies these signals which may be subsequently bandpass filter 98. The filtered RF signals are then transmitted via antenna 102 as outbound RF signals 110 to host device 16. As long as the piconet is established to include microphone 14 and host device 16, microphone 14 will transmit to host device 16 in the manner just described.

As shown in both FIGS. 6 and 7, separable connector 112 may couple setup modules 76 and 92. Such a physical connection allows for earpiece 12 and microphone 14 to communicate in both directions with the host device to establish the piconet. For example, if the devices are compliant with one or more versions of the Bluetooth Specification, host device 16, functioning as the master, may issue a piconet request to earpiece 12 coupled to microphone 14. Upon receiving this request, earpiece 12 and microphone 14 respond to the request indicating that a receive RF channel (communication pathway 18) be setup for the earpiece and a transmit RF channel (communication pathway 20) be setup for microphone 14. Based on these responses, the master coordinates the establishment of the piconet and provides synchronization information through earpiece 12 and microphone 14 via receiver module 40 of earpiece 12. Setup modules 76 and 92 coordinate the synchronization of earpiece 12 and microphone 14 with the host device, as well as coordinating timeslot assignments and/or SCO link assignments. Once the piconet has been established in this manner, the connection between earpiece 12 and microphone may be secured to establish the earpiece 12 and microphone 14 as separate pieces.

As an alternative setup mode, earpiece 12, microphone 14 may be directly coupled to the host device. The direct coupling may be used to establish the piconet and exchange synchronization information, timeslot allocation information, etc. Once the information has been exchanged in this manner, the connections may be broken such that earpiece 12, microphone 14 and host device 16 are physically separate devices.

Figure 8:
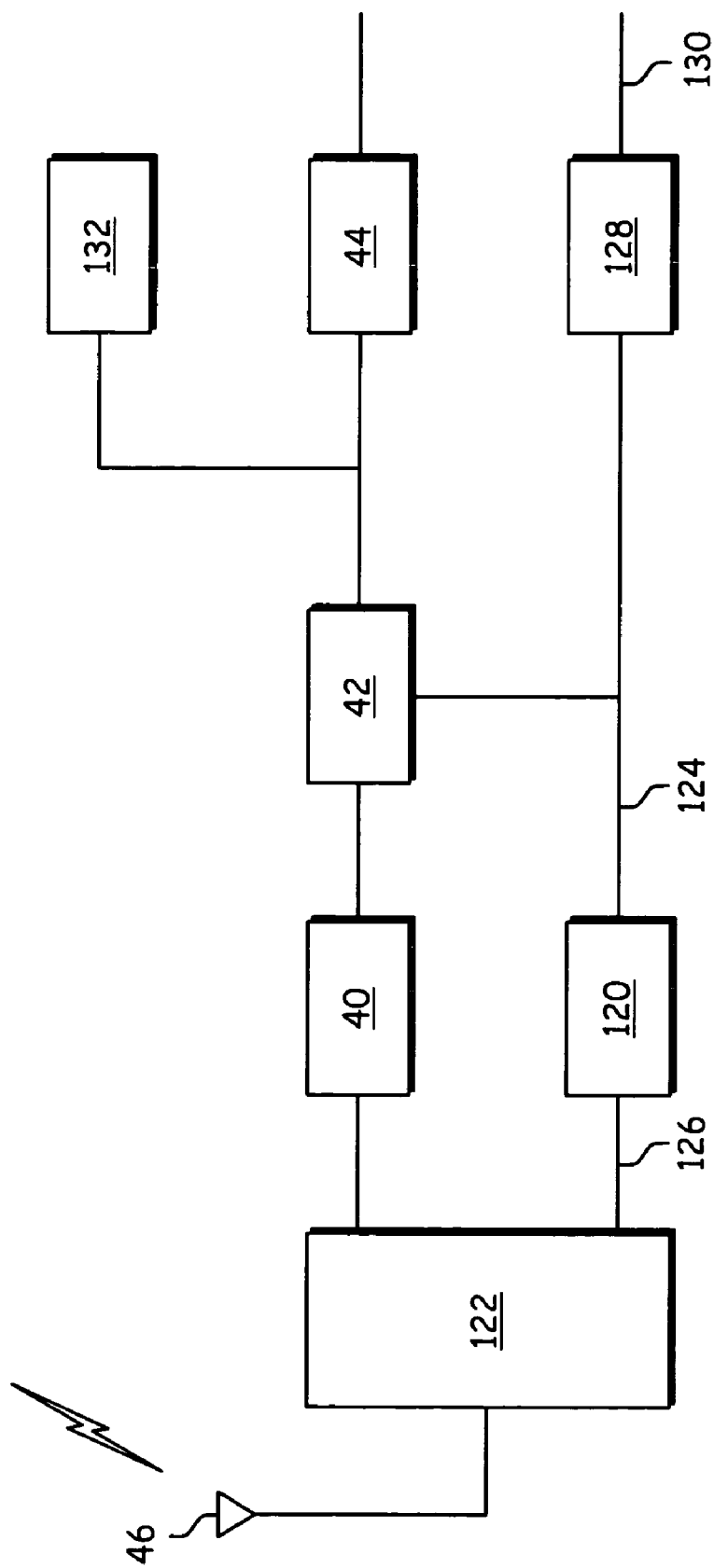
FIG. 8 is a schematic block diagram of a wireless microphone in accordance with the present invention.
Figure 9:
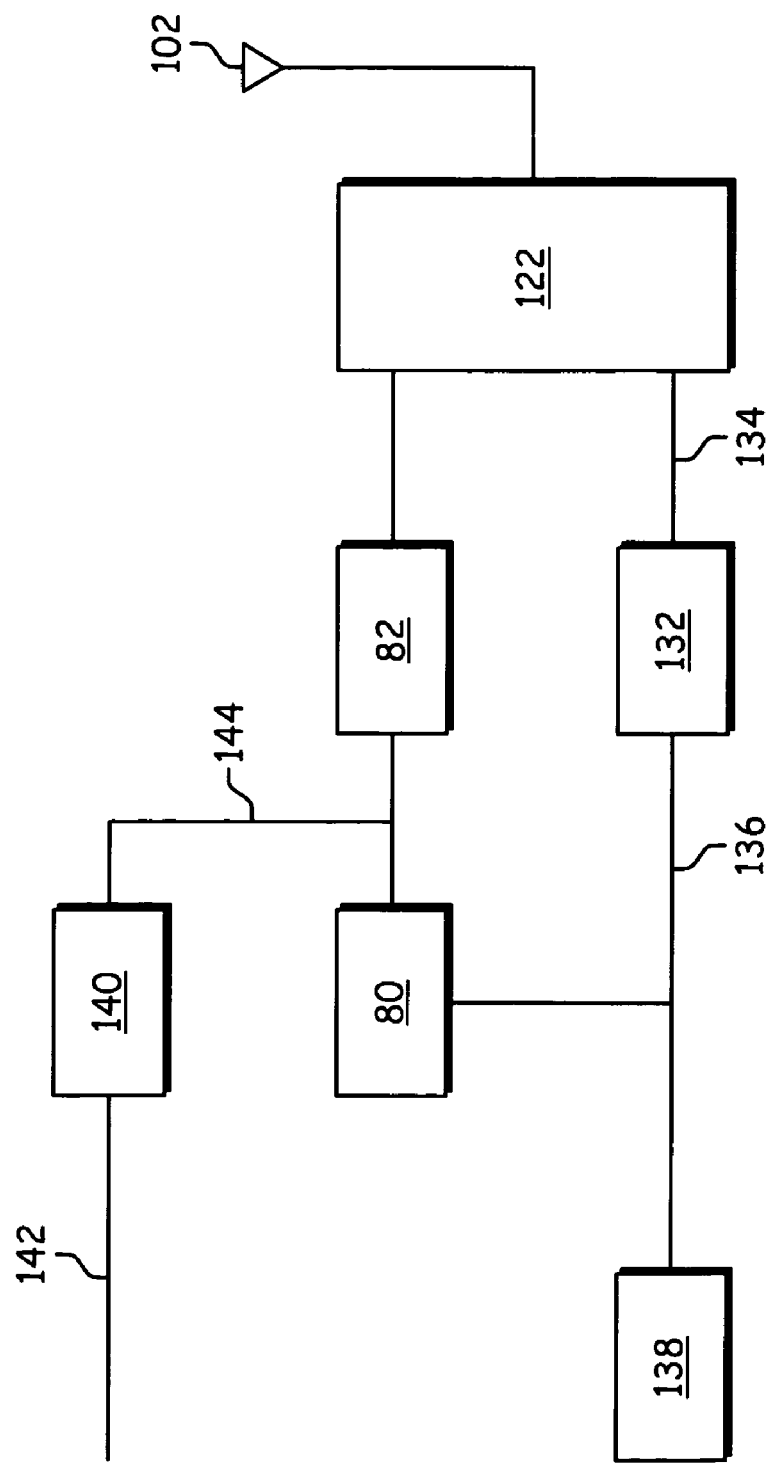
FIG. 9 is a schematic block diagram of a wireless microphone in accordance with the present invention.

FIGS. 8 and 9 illustrate schematic block diagrams of earpiece 12 and microphone 14 that include transceiver modules (i.e., receiver modules and transmitter modules). The use of the transceiver modules allow earpiece 12, microphone 14 and host device 16 to be physically separate devices and be configured using the piconet's RF communications. As such, earpiece 12 and microphone 14 may be continuously worn on a person for receiving incoming calls and/or placing outgoing calls.

Earpiece 12, as shown in FIG. 85, includes antenna 46, transmit/receive switch 122, receiver module 41, data recovery module 45, speaker module 47, transmitter module 120, input module 128 and display module 132. Receiver module 41, data recovery module 45 and speaker module 47 operate as discussed with reference to FIG. 6. Data recovery module 45 may produce display information that is provided to display module 132. For instance, the received RF signal may include display information such as caller ID, command information, etc. which is separated by data recovery module 45 and provided to display module 132, which may be an LCD display, plasma display, etc.

Input module 128, which may be a keypad, touch screen, voice recognition circuit, or other like user interfaces, receives user commands and produces digital command messages 124 there from. Such digital command messages 124 includes, but are not limited to, packet size, synchronization information, frequency hopping initiation information, timeslot allocation information, link establishment information, piconet address information, fast-forward, play, pause, volume adjust, record, stop and rewind.

Data recovery module 45 receives digital command messages 124 and, when applicable, processes the command messages. For example, if the command message is with respect to a volume adjust; a graphical representation of adjusting the volume may be presented on display module 132 and the gain of amplifier 64 adjusted to adjust the volume associated with speaker 66.

Transmit module 120 receives digital command messages 124 and converts these messages into outbound RF command signals 126, which are subsequently transmitted to host device 16 and/or microphone module via antenna 46. Accordingly, by including transmitter module 120 along with receiver module 41, earpiece 12 may function as a master and/or slave within the piconet and exchange data with the other elements within the piconet.

FIG. 9 is a schematic block diagram of microphone 14 that includes audio input module 80, transmitter module 82, transmit receive switch 122, antenna 102, receiver module 132, input module 140 and display module 138. Input module 140 is operable to receive user input commands 142 and convert these commands into digital command messages 144. Input module 140 couples to or includes a user interface that allows a user to initiate enhanced call functions or network hardware operations. These enhanced call functions include call initiation operations, call conferencing operations, call forwarding operations, call hold operations, call muting operations, and call waiting operations. Additionally, the user may access network interface functions, base unit interface functions, directory functions, caller ID functions, voice activated commands and device programming functions. This user interface can be any combinations of visual interface(s), tactile interface(s), and/or an audio interface(s) that allow the user to input commands 142. Digital command messages 144 may be similar to digital command messages 124 and may further include establish a call, terminate a call, call waiting, or other like functions. Transmitter module 82 converts digital command messages 144 into RF command signals 134 that are transmitted via antenna 102. Similarly, inbound RF command signals 135 may be received by receiver module 132 via antenna 102. Display module 138, which may be a LCD display, plasma display, etc., receives digital command messages 136 and may display corresponding configuration messages. In addition, any display information received from the host and/or microphone module regarding setup, operation, or as part of the data content, may be displayed on display module 138.

Figure 10:
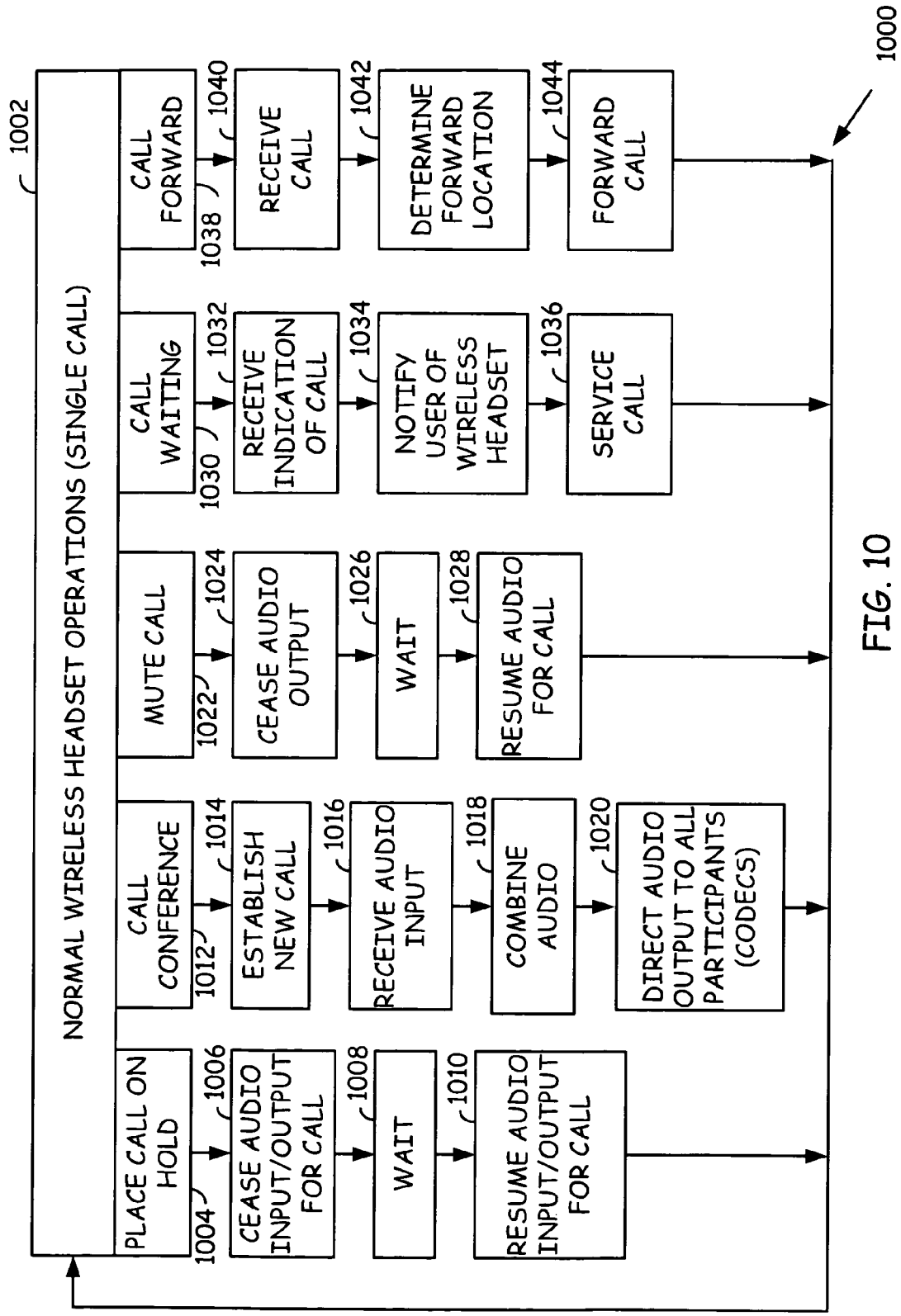
FIG. 10 is a logic diagram illustrating operation of a wireless multimedia device constructed according to the present invention in performing enhanced call management.

FIG. 10 is a logic diagram illustrating operation of a wireless headset constructed according to the present invention in performing enhanced call management. The operations described with reference to FIG. 10 may be performed whole or in part by an on-chip processor within or coupled to processing modules 58 and 100 of FIGS. 6 and 7. During normal operations, the wireless headset services normal operations, e.g., single call or device playback. Other modular devices, such as those of FIG. 2 that couple to the microphone or headset, may perform these operations.

One particular operation that the wireless headset may perform is to place a call on hold (step 1004). In such case, the wireless headset ceases producing audio input and audio output for the call (step 1006). These operations are continued during a wait state (step 1008) until normal operations are resumed for the call (step 1010). From step 1010, operation proceeds to step 1002. The call hold operations of steps 1004-1010 may be performed in conjunction with the other operations of FIG. 10, e.g., call waiting, call muting, call conferencing, etc.

Call conferencing (step 1012) may be initiated by the wireless headset or by a master device if the wireless headset does not have sufficient user interface for call conferencing initiation. In such case, a new call is established by the wireless headset (step 1014). This new call may be serviced by the additional channels serviced by the wireless headset. As was previously described, the wireless headset supports multiple channels. Using this multiple channels, the wireless headset receives audio input from all participants (step 1016) and combines the audio input, along with the input generated by the user of the wireless headset. The wireless headset then directs the combined audio to all participants (their servicing CODECs at step 1020). Note that these operations are continually performed for the duration of the conference call.

The wireless headset may also mute calls (step 1022). In such case, the wireless headset simply ceases all audio output (1024) and waits for the user of the wireless headset to cease the muting operations (step 1026). When the muting has been ceased, the wireless headset resumes the audio servicing of the call (step 1028).

The wireless multimedia device also performs call waiting operations (step 1030). In such case, the wireless multimedia device receives an indication that a call is inbound (step 1032). However, instead of immediately servicing the call, the wireless multimedia device notifies the user of the wireless multimedia device of the call (step 1034), e.g., provides a beeping indication to the user of the wireless multimedia device. The wireless multimedia device then services the call (step 1036), at the direction of the user to either complete the call, have the call join a currently serviced call (via call conferencing operations in some cases), or to ignore the call.

The wireless multimedia device may also perform call forwarding operations according to the present invention (step 1038). In such case, the wireless multimedia device receives the call (step 1040). However, instead of servicing the call, the wireless multimedia device determines a forwarding location for the call (step 1042) and then forwards the call (step 1044). Operation from steps 1010, 1020, 1028, 1036, and 1044 return to step 1002.

Figure 11:
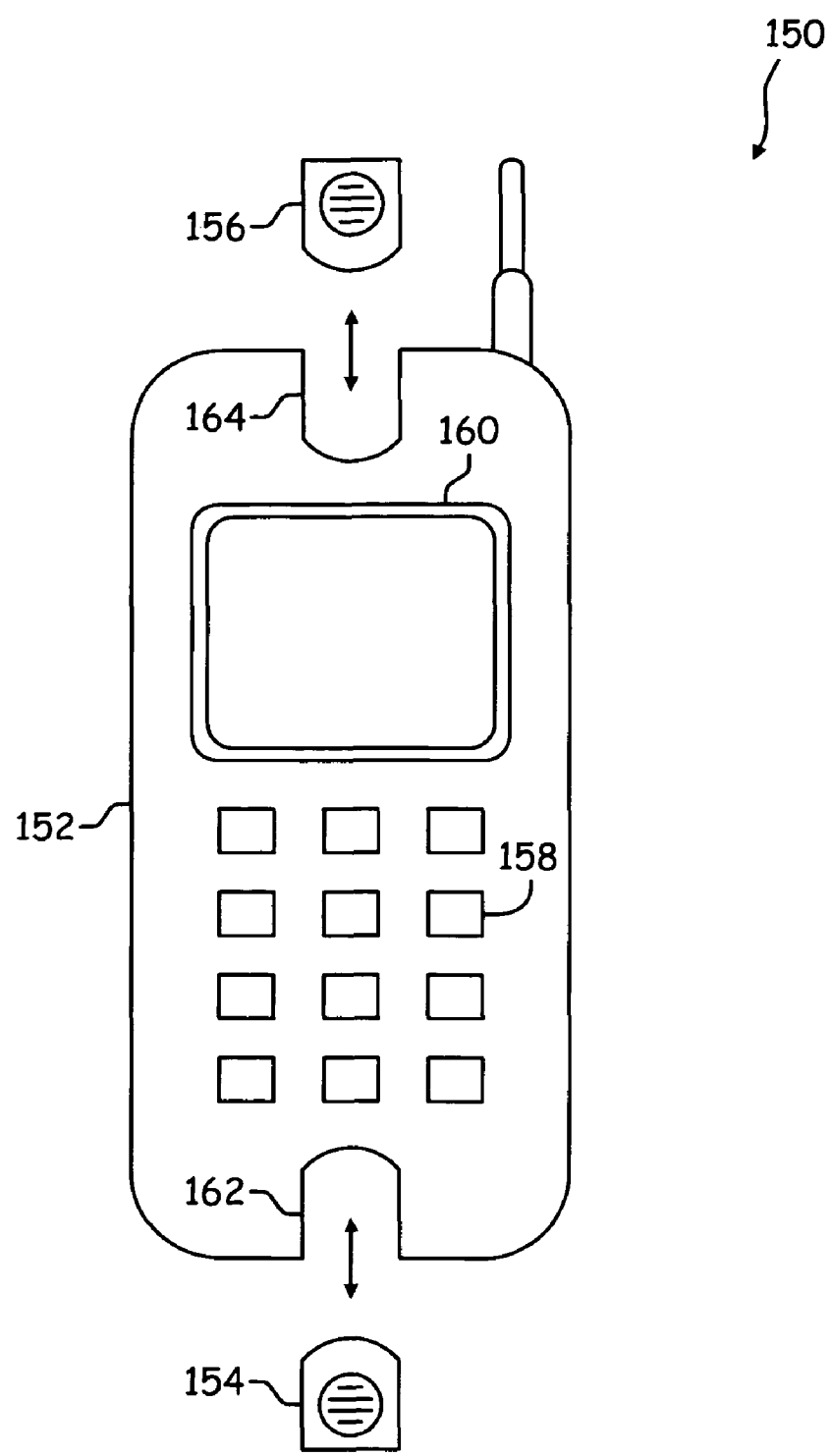
FIG. 11 is a diagram of a modular communication device in accordance with the present invention.

FIG. 11 is a schematic block diagram of modular communication device 150, such as a wireless terminal (e.g., cell phone) that includes host module 152, detachable microphone 154 and detachable earpiece 156. In this embodiment, modular communication device 150 may function as a typical device (e.g., cellular telephone, CD player, cassette player, etc.) when detachable earpiece 156 and detachable microphone 154 are physically connected to host module 152. When detachable earpiece 156 is not in physical contact with host module 152, a wireless connection couples detachable earpiece 156 and host module 152. Similarly, when detachable microphone 154 is detached from host module 152, a second wireless connection couples detachable microphone 154 and host module 152. Alternatively, when detachable earpiece 156 and/or detachable microphone 154 are physically coupled to host module 152, they may communicate via a physical or wireless link. As one of average skill in the art will appreciate, modular communication device 150 may include multiple detachable earpieces 156. In addition, modular communication device 150 may omit detachable microphone 154 if host device 152 is a playback type device (e.g., DVD player, CD player, cassette player, etc.). Similarly, modular communication device 150 may omit detachable earpiece 156 when functioning as a recording device (e.g., dictaphone). Detachable earpiece 156 and microphone 154 may have on-chip operations to support call conferencing, call waiting, flash, and other features associated with telephones. These functions may me accessed and reviewed by a user interface 158 and display 160 within host device 152 or a user interface and display located on either detachable earpiece 156 or microphone 154. The user interface and display, located on either the host device or detachable ear-piece 156 and microphone 154 may have a display and button(s) that may be used to program device, perform directory functions including selecting number to call, view caller ID, initiate call waiting, or initiate call conferencing. Additionally, circuitry within the ear-piece 156 and microphone 154 may enable voice activated dialing. The actual voice recognition could be performed within ear-piece 156, microphone 154, or host device 152. Thus, ear-piece 156 and microphone 154 may act to initiate calls and receive calls.

A link between earpiece 156 and microphone 154 would allow earpiece 156 and microphone 154 to share resources, such as batter life, and allow earpiece 156 and microphone 154 to be recharged from host device 152. Earpiece/microphone/base portion are included with cell phone battery. Cell phone battery has openings 162 and 164 located therein for storage/recharging of earpiece 156 and microphone 154. When located in these openings, the earpiece/microphone will be recharged from the cell phone battery. The new cell phone battery may include base portion RF interface and interface to cell phone port. Existing cell phone port technology could be used to treat the earpiece/microphone in the same manner as wired earpiece/microphone is treated.

Figure 12:
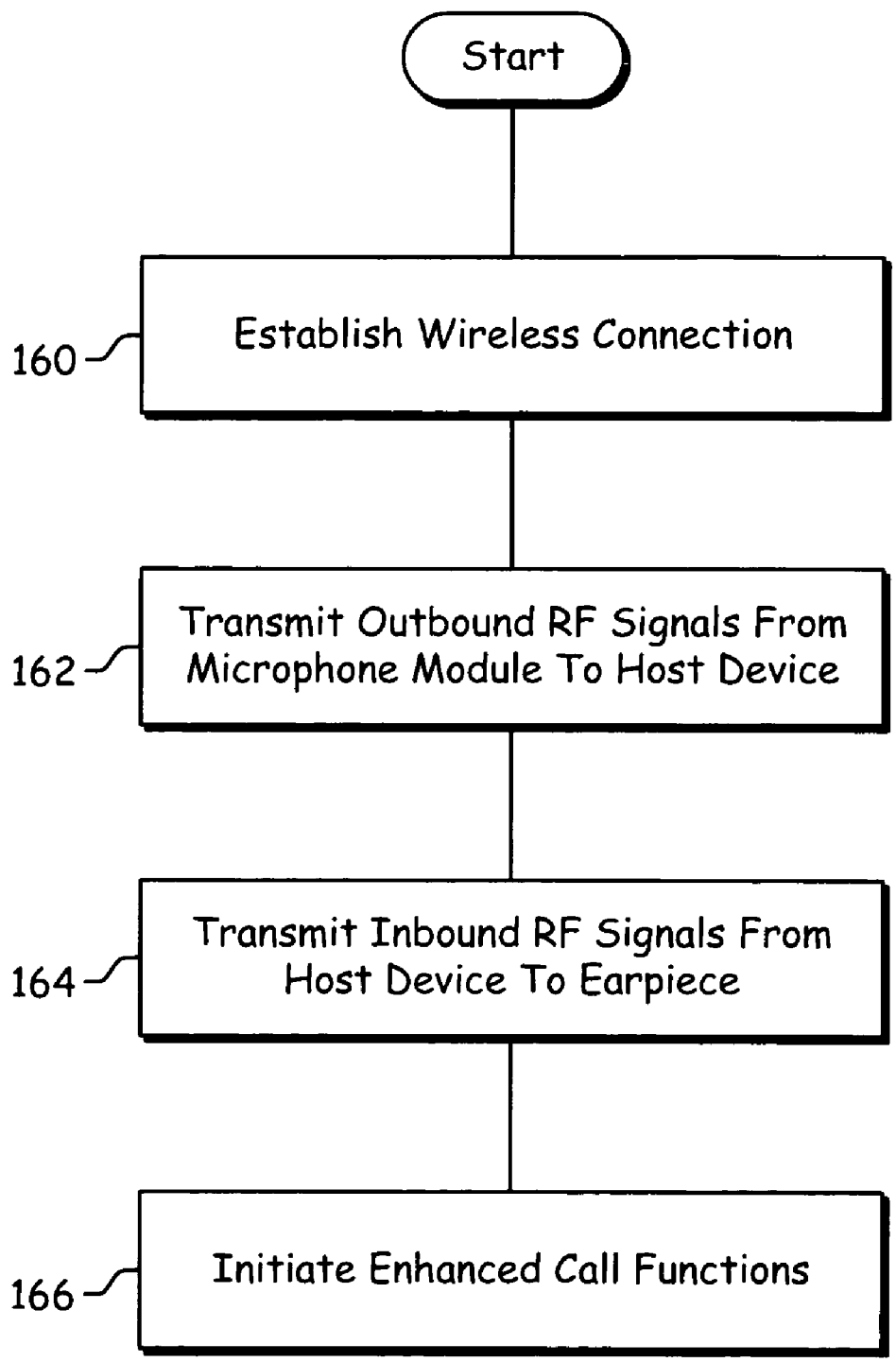
FIG. 12 is a logic diagram of a method for wireless communications within a piconet that includes a wireless multimedia device in initiating enhanced call management functions in accordance with the present invention.

FIG. 12 is a logic diagram of a method for wireless communications serviced by a modular wireless multimedia device and a host device. The process begins at step 160 where the piconet or other like wireless connection is established to include the host device, and modular devices like the earpiece module and the microphone module. This connectivity allows the multimedia device to communicatively couple to various available networks such as a cellular network, public switched telephone network (PSTN), wide area network (WAN), local area network (LAN), and/or wireless local area network (WLAN).

This may be done in a variety of ways. For instance, a piconet may be established by exchanging configuration information via a physical connection between the host device, the earpiece module and the microphone module prior to any RF transmissions there between. Based on the configuration information, the piconet is configured and the devices are separated. Once separated, RF communications may commence. This involves receiving inbound radio frequency (RF) signals from a host device in step 164, wherein the inbound RF signals contain inbound audio, video, text or data communications. These inbound communications are processed and then presented to a user. Outbound communications are captured and converted into outbound RF signals in step 162. Additionally, user commands are captured with a user interface located within one or more modular wireless devices to initiate enhanced call functions, network functions, playback commands or other like commands in step 166. The enhanced call functions may include the ability to initiate network interface functions, base unit interface functions, directory functions, caller ID functions, voice activated commands, call waiting functions, call conferencing functions, call initiation functions and device programming functions.

Alternatively, the piconet may be established by exchanging configuration information via various wireless communication pathways that exist between the host device, the earpiece module and the microphone module prior to data content being transmitted via the communication resources. Once the configuration information is exchanged, the piconet is established and data content RF transmissions may commence.

In step 162, outbound RF signals are transmitted from the microphone module to the host device via a first wireless communication pathway of the piconet. Simultaneously or in a half-duplex mode, step 164 occurs where inbound RF signals are transmitted from the host device to the earpiece module via a second wireless communication resource of the piconet. The communication resources may be different timeslots on the same SCO link or different SCO links The earpiece-module may be configured to block or receive the outbound RF signals transmitted by the microphone module. Such a selection may be user controlled.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a modular communication device, modular wireless multimedia device and modular wireless headphones. By physically separating the microphone from the earpiece and/or by separating the earpieces, more discrete components may be produced that are more comfortable to wear and are less cumbersome to use. As one of average skill in the art will appreciate, other embodiments may be derived from the teaching of the present invention without deviating from the scope of the claims.

What is claimed is:

1. A wireless headset operable to support communications over at least one servicing network, wherein the wireless headset comprises:
   a wireless earpiece operable to receive radio frequency (RF) signals and render the received RF signals audible;
   a wireless microphone operable to capture audio signals and convert the captured audio signals into transmitted RF signals; and
   a user interface having a tactile interface, an audio interface, and a display module, the user interface coupled to at least one of the wireless earpiece and the wireless microphone, and operable to receive a user input command and to produce a command message, wherein the user interface is operable to:
      use the command message to facilitate initiation of enhanced call functions via a host device of the at least one servicing network, wherein the host device and the wireless headset divide management duties related to the enhanced call functions, the division of management duties are provided by lower protocol layers being processed by the host device and upper protocol layers being processed by the wireless headset, and the command message directs the host device to execute the enhanced call functions; and
      receive, in response to the command message, display information for display by the display module.

2. The wireless headset of claim 1, wherein the wireless earpiece and the wireless microphone include a detachable module.

3. The wireless headset of claim 1, wherein the wireless earpiece further comprises:
   a first wireless interface operable to receive and transmit the RF signals;
   a first processing circuit operable to recover a first digital audio signal from the received RF signals;
   a digital to analog converter (DAC) operably coupled to the first wireless interface and the first processing circuit, wherein the DAC is operable to produce analog audio signals from the first digital audio signals; and
   a speaker module coupled to the DAC, wherein the speaker module is operable to render the analog audio signals audible;
   the wireless microphone further includes:
      a microphone transducer operable to capture the audio signals and convert the captured audio signals into the analog audio signals;
      an analog to digital converter (ADC) operably coupled to the microphone transducer, wherein the ADC is operable to produce digital audio signals from the analog audio signals;
      a second processing circuit operable to produce the RF signals from the first digital audio signal; and
      a second wireless interface, operably coupled to the second processing circuit, wherein the second wireless interface is operable to receive and transmit the RF signals.

4. The wireless headset of claim 1, wherein the host device couples the wireless headset to the at least one servicing network selected from the group consisting of:
   cellular network;
   public switched telephone network (PSTN);
   wide area network (WAN);
   local area network (LAN); and
   a wireless local area network (WLAN).

5. The wireless headset of claim 4, wherein the wireless headset is operable to switch from the at least one servicing network to another servicing network while servicing a voice communication.

6. The wireless headset of claim 1, wherein the enhanced call functions comprise at least one function selected from the group consisting of:
   network interface functions;
   base unit interface functions;
   directory functions;
   caller ID functions;
   voice activated commands;
   call waiting functions;
   call conferencing functions;
   call initiation functions; and
   device programming functions.

7. The wireless headset of claim 1, wherein the tactile interface comprises one-touch buttons operable to initiate the enhanced call functions.

8. The wireless headset of claim 1, wherein the audio interface further comprises a voice recognition system (VRS) operable to recognize voice commands.

9. The wireless headset of claim 8, further comprising circuitry to implement the VRS.

10. The wireless headset of claim 8, wherein the VRS is operable to implement voice activated commands while servicing voice communications.

11. The wireless headset of claim 1, wherein the user interface supports at least one of validation of the at least one servicing network and authentication of the at least one servicing network.

12. A method to service communications between a servicing network and a modular wireless headset, wherein the method comprises:
   receiving inbound radio frequency (RF) signals from a host device with a wireless earpiece, wherein the inbound RF signals contain inbound digital voice communications;
   converting the inbound digital voice communications into inbound analog voice communications;
   rendering the inbound analog voice communications audible with the wireless earpiece;
   capturing outbound voice communications with a wireless microphone having a microphone transducer;
   converting the captured outbound voice communications into outbound digital voice communications;
   converting the outbound digital voice communications into outbound digital RF signals to be transmitted from the wireless microphone to the host device; and
   initiating enhanced call functions via the host device of the servicing network based upon a user input command from a user interface coupled to a tactile interface and an audio interface, wherein the host device and the modular wireless headset divide management duties related to the enhanced call functions, the division of management duties are provided by lower protocol layers being processed by the host device and by upper protocol layers being processed by the modular wireless headset, and the user interface includes a display module, and the user input command derives from either of the tactile interface or the audio interface; and
   receiving, in response to the user input command, display information for display by the display module.

13. The method of claim 12, further comprising coupling the modular wireless headset to the servicing network selected from the group consisting of:
   cellular network;
   public switched telephone network (PSTN);
   wide area network (WAN);
   local area network (LAN); and
   a wireless local area network (WLAN).

14. The method of claim 12, wherein the modular wireless headset is operable to switch servicing networks while servicing a voice communication.

15. The method of claim 12, wherein the enhanced call functions comprise at least one function selected from the group consisting of:
   network interface functions;
   base unit interface functions;
   directory functions;
   caller ID functions;
   voice activated commands;
   call waiting functions;
   call conferencing functions;
   call initiation functions; and
   device programming functions.

16. The method of claim 12, wherein the tactile interface comprises one-touch buttons operable to initiate the enhanced call functions.

17. The method of claim 12, wherein the audio interface further comprises a voice recognition system (VRS) operable to recognize voice commands.

18. The method of claim 17, wherein the user input command is provided via a wireless microphone coupled to the user interface, wherein the user interface includes circuitry to implement the VRS.

19. The method of claim 17, further comprising identifying and implementing voice activated commands while servicing voice communications.

20. The method of claim 12, further comprising:
   validating the servicing network with the user interface; and
   authenticating the servicing network with the user interface.

21. A wireless headset operable to support voice communications over at least one servicing network, the wireless headset comprises:
   at least one wireless earpiece wirelessly coupled to at least one host device coupled to the at least one servicing network, wherein the at least one wireless earpiece is operable to receive radio frequency (RF) signals and render the received RF signals audible, wherein the at least one wireless earpiece includes:
      a first wireless interface operable to receive and transmit the RF signals;
      a first processing circuit operable to recover a first digital audio signal from the received RF signals;
      a digital to analog converter (DAC) operably coupled to the first wireless interface and first processing circuit, wherein the DAC is operable to produce analog audio signals from the first digital audio signal; and
      a speaker module coupled to the DAC, wherein the speaker module is operable to render the analog audio signals audible;
   at least one wireless microphone wirelessly coupled to the at least one wireless earpiece or the at least one host device, the at least one of the wireless earpiece and the wireless microphone are in a detachable fixed-relation to one another, wherein the at least one wireless microphone is operable to capture audio signals and convert the audio signals into transmitted RF signals, wherein the at least one wireless microphone includes:
      a microphone transducer operable to capture incoming audio signals and convert the captured incoming audio signals into incoming analog audio signals;
      an analog to digital converter (ADC) operably coupled to the microphone transducer, wherein the ADC is operable to produce second digital audio signals from the incoming analog audio signals;
      a second processing circuit operable to produce second RF signals from the second digital audio signal; and
      a second wireless interface, operably coupled to the second processing circuit, wherein the second wireless interface is operable to receive and transmit the RF signals; and
   at least one user interface that includes a tactile interface, an audio interface, and a display module, the at least one user interface coupled to either of the at least one wireless earpiece and the at least one wireless microphone, and operable to receive a user input command to produce a command message, wherein the at least one user interface operable to:
      facilitate the initiation of enhanced call functions via the at least one host device coupled to the at least one servicing network using the command message, wherein the at least one host device and the wireless headset divide management duties related to the enhanced call functions, the division of management duties are provided by lower protocol layers being processed by the at least one host device and by upper protocol layers being processed by the wireless headset, and the command message directs the at least one host device to execute the enhanced call functions; and receive, in response to the command message, display information for display by the display module.

22. The wireless headset of claim 21, wherein the at least one servicing network is selected from the group consisting of:
cellular network;
public switched telephone network (PSTN);
wide area network (WAN);
local area network (LAN); and
a wireless local area network (WLAN).

23. The wireless headset of claim 22, wherein the wireless headset is operable to switch from the at least one servicing network to another servicing network while servicing voice communications.

24. The wireless headset of claim 21, wherein the enhanced call functions comprise at least one function selected from the group consisting of:
network interface functions;
base unit interface functions;
directory functions;
caller ID functions;
voice activated commands;
call waiting functions;
call conferencing functions;
call initiation functions; and
device programming functions.

25. The wireless headset of claim 21, wherein the tactile interface comprises one-touch buttons initiate the enhanced call functions.

26. The wireless headset of claim 21, wherein the audio interface receives audio commands from the at least one wireless microphone, and further comprises a voice recognition system (VRS) operable to recognize voice commands as the user input command.

27. The wireless headset of claim 26, wherein the audio interface is operable to initiate the voice commands while servicing voice communications.

28. The wireless headset of claim 21, wherein the at least one user interface supports at least one of validation of the at least one servicing network and authentication of the at least one servicing network.

* * * * *